US011315390B2

(12) United States Patent
Park et al.

(10) Patent No.: US 11,315,390 B2
(45) Date of Patent: Apr. 26, 2022

(54) TRANSFER PATH UNIT STRUCTURE FOR SUPPLY/COLLECTION CASSETTE OF ATM

(71) Applicant: Hyosung TNS Inc., Seoul (KR)

(72) Inventors: Chang Ho Park, Gunpo-si (KR); Jae Hoon Kwak, Seoul (KR); Suk Joo Kim, Yongin-si (KR); Tae Min Choi, Seoul (KR); Hyun Sung Chung, Hwaseong-si (KR)

(73) Assignee: HYOSUNG TNS INC., Seoul (KR)

( * ) Notice: Subject to any disclaimer, the term of this patent is extended or adjusted under 35 U.S.C. 154(b) by 195 days.

(21) Appl. No.: 16/790,122

(22) Filed: Feb. 13, 2020

(65) Prior Publication Data

US 2020/0184780 A1 Jun. 11, 2020

Related U.S. Application Data

(63) Continuation of application No. PCT/KR2019/007029, filed on Jun. 11, 2019.

(30) Foreign Application Priority Data

Jun. 11, 2018 (KR) ........................ 10-2018-0066681

(51) Int. Cl.
*B65G 1/00* (2006.01)
*G07F 19/00* (2006.01)

(52) U.S. Cl.
CPC .................................... *G07F 19/20* (2013.01)

(58) Field of Classification Search
CPC ........ G07D 11/00; G07D 11/40; G07F 19/00; G07F 19/20
See application file for complete search history.

(56) References Cited

U.S. PATENT DOCUMENTS 7,451,977 B2 * 11/2008 Gabel .................... B65H 29/46 109/22
7,726,558 B1 * 6/2010 Lute ........................ G07F 19/20 235/379

(Continued)

FOREIGN PATENT DOCUMENTS

JP 2015-158730 A 9/2015
KR 10-2006-0130400 A 12/2006

(Continued)

OTHER PUBLICATIONS

PCT First Notice Informing the Applicant of the Communication of the International Application, PCT Application No. PCT/KR2019/007029, dated Jan. 16, 2020, one page.

(Continued)

*Primary Examiner* — Thien M Le
(74) *Attorney, Agent, or Firm* — Fenwick & West LLP

(57) ABSTRACT

The present disclosure relates to a transit transfer path unit structure connecting a supply/collection cassette and a banknote transfer path of an upper main body in an ATM which includes the upper main body and a lower main body and has a structure in which the supply/collection cassette is mounted on one side of the lower main body. The transit transfer path unit is disposed on one side of the upper main body of the ATM, and detachably provided between the supply/collection cassette and the banknote transfer path provided in the upper main body for separation from a banknote transfer route. Thus, the upper main body may be easily pulled to the front or rear of the ATM without any interference with the transit transfer path unit to perform the maintenance work, enhancing the convenience of the maintenance of the ATM.

9 Claims, 5 Drawing Sheets

(56) References Cited

U.S. PATENT DOCUMENTS

| | | | | |
|---|---|---|---|---|
| 7,735,722 | B1 * | 6/2010 | Lute | G07F 19/205 235/379 |
| 2008/0290595 | A1 * | 11/2008 | Fujita | G07D 11/40 271/278 |
| 2015/0363991 | A1 * | 12/2015 | Yoon | B65H 29/001 700/232 |
| 2017/0103621 | A1 * | 4/2017 | Beskitt | G07F 19/205 |
| 2020/0027301 | A1 * | 1/2020 | Beskitt | G07D 11/14 |
| 2020/0027319 | A1 * | 1/2020 | Beskitt | G07D 11/40 |

FOREIGN PATENT DOCUMENTS

| | | | |
|---|---|---|---|
| KR | 10-1467704 | B1 | 12/2014 |
| KR | 10-2016-0105038 | A | 9/2016 |
| KR | 10-1775779 | B1 | 9/2017 |
| WO | WO 2019/240474 | A1 | 12/2019 |

OTHER PUBLICATIONS

PCT International Search Report, PCT Application No. PCT/KR2019/007029, dated Oct. 11, 2019, two pages.
PCT Notification Concerning Submission, Obtention or Transmittal of Priority Document, PCT Application No. PCT/KR2019/007029, dated Jun. 24, 2019, one page.
PCT Notification of Receipt of Record Copy, PCT Application No. PCT/KR2019/007029, dated Jun. 20, 2019, one page.

* cited by examiner

TRANSFER PATH UNIT STRUCTURE FOR SUPPLY/COLLECTION CASSETTE OF ATM

CROSS-REFERENCE TO RELATED APPLICATIONS

This application is a bypass continuation application of PCT International Application No. PCT/KR2019/007029 filed on Jun. 11, 2019, which claims priority to Republic of Korea Patent Application No. 10-2018-0066681 filed on Jun. 11, 2018, which are incorporated by reference herein in their entirety.

TECHNICAL FIELD

The present disclosure relates to a transit transfer path unit structure for a supply/collection cassette of an ATM (Automated Teller Machine), and more particularly, to a transit transfer path unit structure connecting a supply/collection cassette and a banknote transfer path provided in an upper main body in an ATM which includes the upper main body having a deposit/withdrawal part, a temporary storage part and a banknote transfer path and a lower main body having a plurality of banknote cassettes, and has a structure in which the supply/collection cassette is mounted on one side of the lower main body. The transit transfer path unit is disposed on one side of the upper main body of the ATM, and detachably provided between the supply/collection cassette and the banknote transfer path provided in the upper main body so as to be separated from a banknote transfer route connecting the supply/collection cassette and the banknote transfer path provided in the upper main body during maintenance work for the ATM. Thus, the upper main body may be easily pulled to the front or rear of the ATM without any interference with the transit transfer path unit in order to perform the maintenance work, which makes it possible to increase the convenience of the maintenance of the ATM.

BACKGROUND ART

In general, an ATM (Automated Teller Machine) refers to an automated device that can assist a basic financial service such as a deposit or withdrawal service without a bank teller, regardless of the time and place in relation to the financial service, and is configured to automatically help a customer to withdraw or deposit cash using a medium such as a card or bankbook.

The above-described advantages of the ATM have rapidly increased the number of customers who use ATMs, the number of installed ATMs, and the number of installation places. Nowadays, ATMs can be easily found anywhere.

Such an ATM typically includes an upper main body and a lower main body. The upper main body has a deposit/withdrawal part which is formed on a front surface thereof and a temporary storage part, a banknote detection part and a banknote transfer path which are formed therein, and the lower main body has a plurality of banknote cassettes provided therein. In general, an ATM for bank teller includes a supply/collection cassette for easily handling various kinds of banknotes. In some cases, an ATM for customer also needs to handle various types of banknotes. Therefore, more and more ATMs have a supply/collection cassette for smooth banknote operation of banknote cassettes for the respective kinds of banknotes, if necessary.

As disclosed in Korean Patent Application Publication No. 2016-0139764, a supply/collection cassette is typically mounted on a rear surface of an ATM, and an auxiliary transfer path (transit transfer path) is provided to connect the supply/collection cassette mounted on the rear surface of the ATM to a banknote transfer path within the ATM.

The auxiliary transfer path is disposed at the rear of an upper main body of the ATM, and serves to transfer a banknote discharged from the supply/collection cassette to the banknote transfer path provided in the upper main body, or to introduce a banknote transferred from the banknote transfer path into the supply/collection cassette.

During maintenance work on such an ATM, the upper main body of the ATM is typically pulled forward or backward to perform repair. At this time, the auxiliary transfer path connected between the upper main body and the supply/collection cassette may interfere with the upper main body. In the related art, the upper main body and the auxiliary transfer path are simultaneously pulled out of the ATM in order to prevent the interference. In this case, however, since the upper main body and the auxiliary transfer path still interfere with each other during maintenance work, the convenience of the maintenance is degraded.

SUMMARY

Various embodiments are directed to a transit transfer path unit structure connecting a supply/collection cassette and a banknote transfer path provided in an upper main body in an ATM which includes the upper main body having a deposit/withdrawal part, a temporary storage part and a banknote transfer path and a lower main body having a plurality of banknote cassettes, and has a structure in which the supply/collection cassette is mounted on one side of the lower main body. The transit transfer path unit is disposed on one side of the upper main body of the ATM, and detachably provided between the supply/collection cassette and the banknote transfer path provided in the upper main body so as to be separated from a banknote transfer route connecting the supply/collection cassette and the banknote transfer path provided in the upper main body during maintenance work for the ATM. Thus, the upper main body may be easily pulled to the front or rear of the ATM without any interference with the transit transfer path unit in order to perform the maintenance work, which makes it possible to increase the convenience of the maintenance of the ATM.

In an embodiment, there is provided a transit transfer path unit structure for a supply/collection cassette of an ATM (Automated Teller Machine) which includes an upper main body having a deposit/withdrawal part, a temporary storage part and a banknote transfer path and a lower main body having a plurality of banknote cassettes, and has a structure in which a supply/collection cassette is mounted on one side of the lower main body. The transit transfer path unit structure may include a transit transfer path unit connected to form a banknote transfer route between the supply/collection cassette and the banknote transfer path provided in the upper main body, and detachably mounted between the supply/collection cassette and the banknote transfer path provided in the upper main body. During maintenance work for the ATM, the transit transfer path unit may be separated from the banknote transfer route that connects the supply/collection cassette to the banknote transfer path provided in the upper main body, in order to prevent interference during a process of sliding the upper main body to the front or rear of the ATM.

The transit transfer path unit structure for the supply/collection cassette of the ATM in accordance with the present disclosure is disposed at the rear of the upper main body of the ATM, such that the transit transfer path unit for connecting the supply/collection cassette mounted on the rear surface of the lower main body of the ATM to the banknote transfer path of the upper main body is detachably provided between the supply/collection cassette and the banknote transfer path provided in the upper main body. Thus, during maintenance work for the ATM, the transit transfer path unit may be separated from the banknote transfer route that connects the supply/collection cassette to the banknote transfer path provided in the upper main body. Therefore, the upper main body may be easily pulled to the front or rear of the ATM without any interference with the transit transfer path unit, in order to perform the maintenance work, which makes it possible to increase the convenience of the maintenance of the ATM.

Furthermore, the transit transfer path unit structure may include the lever-shaped fixing member formed on one side of the transit transfer path unit and having the pair of hooks formed thereon and the coupling pin coupled to the supply/collection cassette in connection with the fixing member, in order to reliably fix the coupling position of the transit transfer path unit which is detachably coupled through the fixing member. When the transit transfer path unit is coupled and fixed between the supply/collection cassette and the banknote transfer path within the ATM, the banknote transfer routes between the supply/collection cassette and the transit transfer path may be accurately aligned with each other and coupled to each other through the coupling pin. Therefore, an occurrence of alignment error on the banknote transfer path can be prevented to effectively reduce a banknote transfer error.

DETAILED DESCRIPTION

Hereafter, exemplary embodiments of the present disclosure will be described in detail, but the present disclosure is not limited to the embodiments unless departing from the scope thereof.

Figure 1:
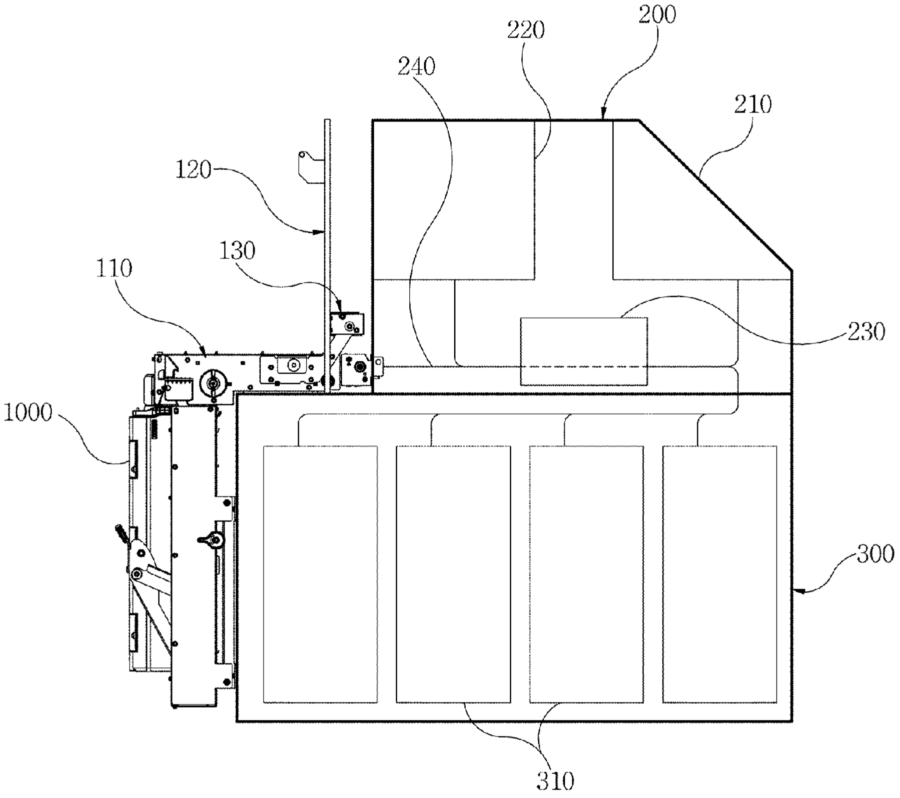
FIG. 1 is a diagram schematically illustrating a configuration of an ATM to which a transit transfer path unit structure for a supply/collection cassette in accordance with an embodiment of the present disclosure is applied.
Figure 2:
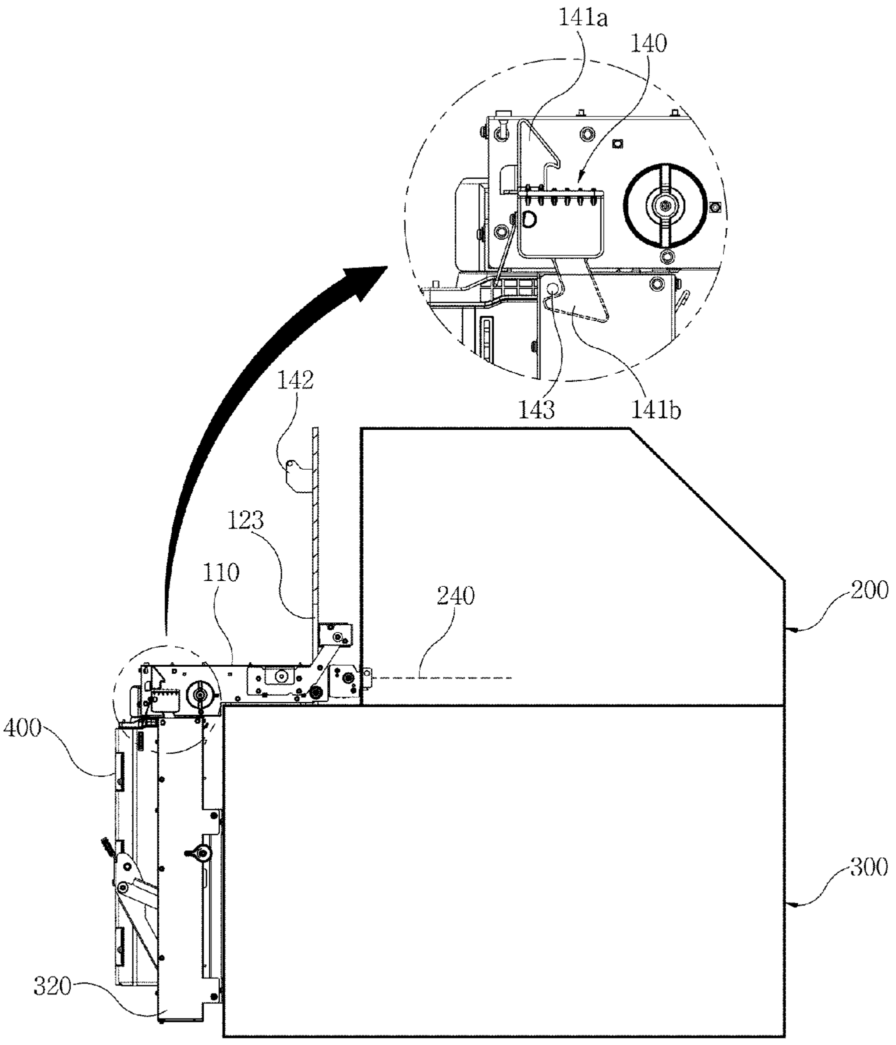
FIGS. 2 and 3 are diagrams illustrating an upward/downward rotation structure of a transit transfer path unit in accordance with the embodiment of the present disclosure.
Figure 3:
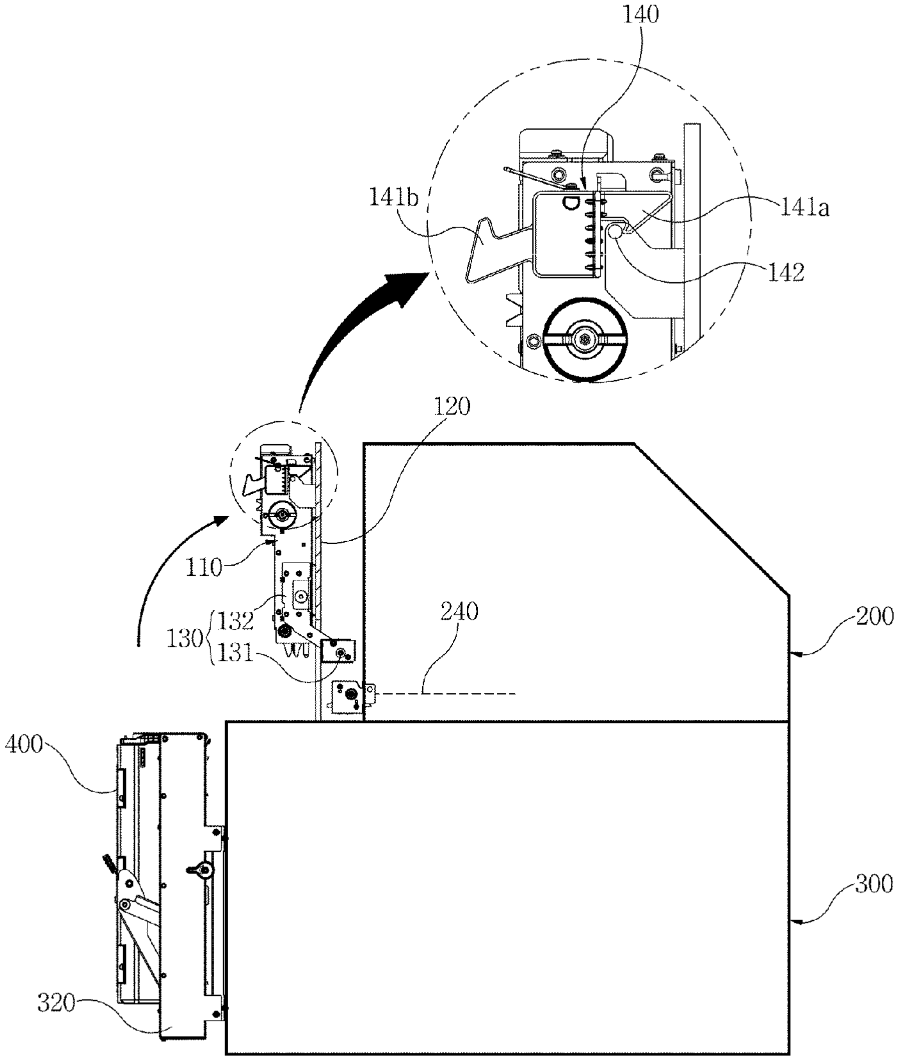
Figure 4:
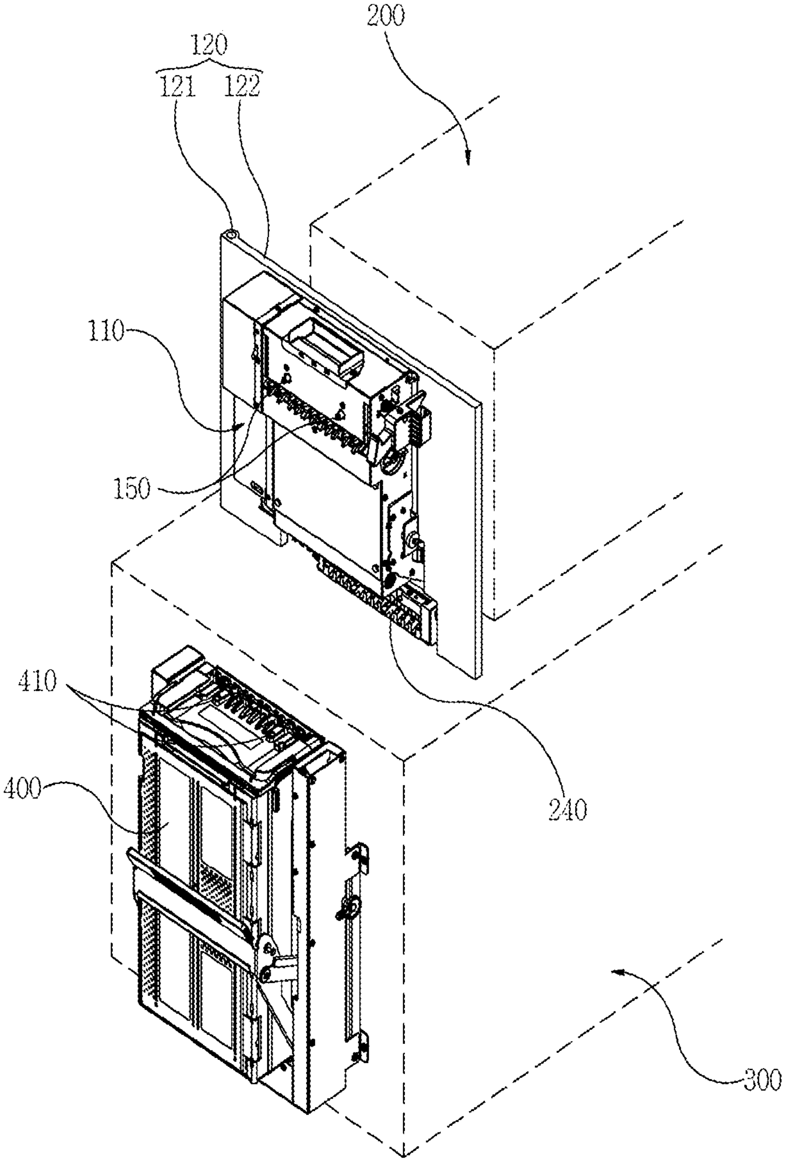
FIGS. 4 and 5 are diagrams illustrating a lateral rotation structure of a gate unit to which the transit transfer path unit in accordance with the embodiment of the present disclosure is connected.
Figure 5:
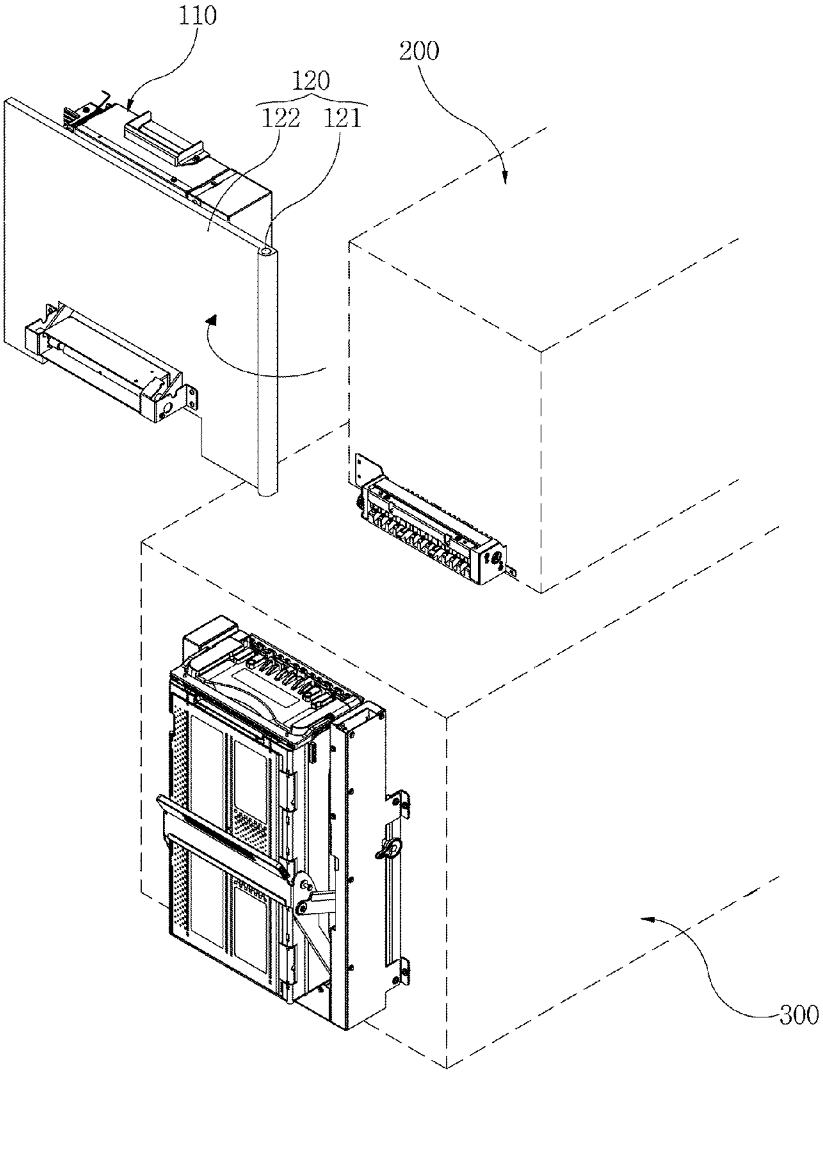

FIG. 1 is a diagram schematically illustrating a configuration of an ATM to which a transit transfer path unit structure for a supply/collection cassette in accordance with an embodiment of the present disclosure is applied, FIGS. 2 and 3 are diagrams illustrating an upward/downward rotation structure of a transit transfer path unit in accordance with the embodiment of the present disclosure, and FIGS. 4 and 5 are diagrams illustrating a lateral rotation structure of a gate unit to which the transit transfer path unit in accordance with the embodiment of the present disclosure is connected.

As illustrated in FIGS. 1 to 5, the ATM to which the transit transfer path unit structure for a supply/collection cassette in accordance with the embodiment of the present disclosure is applied has a structure in which a supply/collection cassette is mounted on a rear surface of a main body, and includes an upper main body 200 and a lower main body 300. The upper main body 200 has a deposit/withdrawal part 210 which is provided at a front surface thereof and a temporary storage part 220, a banknote detection part 230 and a banknote transfer path 240 which are provided therein, and the lower main body 300 has a plurality of banknote cassettes 310 provided therein. A supply/collection cassette 400 is detachably mounted at the rear of the lower main body 300, and a transit transfer path unit 110 is provided at the rear of the upper main body 200 so as to connect the supply/collection cassette 400 and the banknote transfer path provided in the upper main body 200.

Typically, when maintenance work for the ATM is performed, the upper main body 200 is pulled to the front or rear of the ATM, in order to repair the inside of the upper main body 200 which includes main components for banknote processing, such as the deposit/withdrawal part 210, the temporary storage part 220, the banknote detection part 230 and the banknote transfer path 240. In the present embodiment, the transit transfer path unit 110 is detachably provided to connect the supply/collection cassette 400 and the banknote transfer path 240 provided in the upper main body 200 during the process of pulling out the upper main body 200 forward or backward. Thus, the interference between the transit transfer path unit 110 and the upper main body 200 can be avoided.

That is, as illustrated in FIGS. 1 to 5, the transit transfer path unit structure for the supply/collection cassette of the ATM in accordance with the embodiment of the present disclosure includes the transit transfer path unit 110 for the supply/collection cassette, which is connected to form a banknote transfer route between the supply/collection cassette 400 and the banknote transfer path 240 provided in the upper main body 200 in the ATM, and the transit transfer path unit 110 is detachably provided between the supply/collection cassette 400 and the banknote transfer path 240 provided in the upper main body 200. Thus, during maintenance work for the ATM, the transit transfer path unit 110 can be separated from the banknote transfer route which connects the supply/collection cassette 400 and the banknote transfer path 240 provided in the upper main body 200, in order to prevent interference while the upper main body 200 is slid to the front or rear of the ATM.

In such a configuration of the transit transfer path unit structure for the supply/collection cassette in accordance with the embodiment of the disclosure, the transit transfer path unit can be separated from between the supply/collection cassette and the banknote transfer path provided in the upper main body during maintenance work for the ATM. Therefore, the upper main body may be easily pulled to the front or rear of the ATM without any interference with the transit transfer path unit, such that the maintenance work can be performed, which makes it possible to increase the convenience of the maintenance.

Hereafter, the detailed structure and operation process of the transit transfer path unit structure for the supply/collection cassette of the ATM in accordance with the embodiment of the present disclosure will be described in more detail with reference to the accompanying drawings.

As illustrated in FIG. 2, the supply/collection cassette 400 is detachably mounted on the rear surface of the lower main body 300 of the ATM, and the transit transfer path unit 110 is provided at the rear of the upper main body 200 so as to connect the supply/collection cassette 400 and the banknote transfer path 240 provided in the upper main body 200.

At this time, the transit transfer path unit 110 may have a transit transfer path (not illustrated) provided therein, the transit transfer path forming the banknote transfer route.

Thus, when banknotes are to be supplied to a banknote cassette 310 (see FIG. 1) within the ATM through the supply/collection cassette 400 with the supply/collection cassette 400 connected to the banknote transfer path 240 of the upper main body 200 through the transit transfer path unit 110, banknotes discharged from the supply/collection cassette 400 are transferred to the banknote transfer path 240 (see FIG. 1) provided in the upper main body 200 along the transit transfer path (not illustrated) within the transit transfer path unit 110. Therefore, the banknotes can be supplied to the banknote cassette 310 (see FIG. 1) within the ATM through the banknote transfer path 240 (see FIG. 1).

When banknotes are to be collected from a banknote cassette 310 (see FIG. 1) within the ATM through the supply/collection cassette 400, banknotes discharged from the banknote cassette 310 (see FIG. 1) within the ATM are put into the supply/collection cassette 400 through the transit transfer path (not illustrated) within the transit transfer path unit 110 along the banknote transfer path 240 (see FIG. 1) of the upper main body 200.

The transit transfer path unit 110 is detachably provided between the supply/collection cassette 400 and the banknote transfer path 240 provided in the upper main body 200.

That is, as illustrated in FIGS. 2 and 3, the transit transfer path unit 110 may be provided at the rear of the upper main body 200 of the ATM so as to be rotated and folded. Thus, the transit transfer path unit 110 may be rotated to connect the supply/collection cassette 400 to the banknote transfer path 240 provided in the upper main body 200, or to separate the supply/collection cassette 400 from the banknote transfer path 240 provided in the upper main body 200.

For this structure, the transit transfer path unit structure in accordance with the present embodiment may include a gate unit 120 provided at the rear of the upper main body 200 so as to rotatably fix the transit transfer path unit 110, and the gate unit 120 may be disposed between the upper main body 200 and the transit transfer path unit 110.

The gate unit 120 may be formed in a door shape and disposed at the rear of the upper main body 200 so as to be perpendicular to the top of the lower main body 300, and have a hinge part 130 provided at the bottom of the body thereof and connected to both sides of the transit transfer path unit 110. Thus, the transit transfer path unit 110 may be rotated upward/downward on the gate unit 120 through the hinge part 130.

The hinge part 130 may include a hinge shaft 131 and a pair of rotating frames 132. The hinge shaft 131 is horizontally disposed and fixed on the gate unit 120, and each of the pair of rotating frames 132 may have one end rotatably fixed to the hinge shaft 131 and the other end fixed to a side surface of the transit transfer path unit 110.

The gate unit 120 has a through-hole 123 formed at the bottom of the body thereof such that the transit transfer path unit 110 can be connected to the banknote transfer path 240 of the upper main body 200 through the gate unit 120.

In such a configuration as illustrated in FIG. 3, the transit transfer path unit 110 may be rotated upward through the hinge part 130 connected to the gate unit 120 and folded toward the gate unit 120 so as to be separated from the banknote transfer route that connects the supply/collection cassette 400 to the banknote transfer path 240 provided in the upper main body 200. Alternatively, as illustrated in FIG. 2, the transit transfer path unit 110 may be rotated downward such that one connection part of the transit transfer path unit 110 is connected to the banknote transfer path 240 provided in the upper main body 200 and simultaneously the other connection part of the transit transfer path unit 110 is connected to the supply/collection cassette 400.

At this time, when the supply/collection cassette 400 is removed from the ATM, the transit transfer path unit 110 is rotated toward the gate unit 120 and folded to operate the ATM. On the other hand, when the supply/collection cassette 400 is mounted in the ATM, the folded transit transfer path unit 110 is rotated toward the supply/collection cassette 400 to connect the supply/collection cassette 400 and the banknote transfer path 240 of the upper main body 200 through the transit transfer path unit 110.

When the upper main body 200 is pulled to the front of the ATM during maintenance work for the ATM, the transit transfer path unit 110 is rotated toward the gate unit 120, and folded so as to be separated from between the supply/collection cassette 400 and the banknote transfer path 240 of the upper main body 200. Therefore, while the upper main body 200 is pulled to the front of the ATM, the interference between the upper main body 200 and the transit transfer path unit 110 can be effectively prevented, which makes it possible to increase the convenience of the maintenance for the ATM.

The transit transfer path unit 110 may have a fixing member 140 provided on one side of the side surface thereof. Thus, the transit transfer path unit 110 may not be moved but reliably fixed by the fixing member 140, while the transit transfer path unit 110 is folded toward the gate unit 120 or unfolded to connect the supply/collection cassette 400 and the banknote transfer path 240 of the upper main body 200 to each other. The detailed structure of the fixing member 140 will be described below.

As illustrated in FIGS. 4 and 5, the gate unit 120 connected to the transit transfer path unit 110 through the hinge part 130 may be rotated toward one side of the upper main body 200.

At this time, the gate unit 120 may include a rotating shaft 121 and a gate body 122. The rotating shaft 121 may be vertically fixed to one edge of the top surface of the lower main body 300 at the rear of the upper main body 200, and the gate body 122 may have one side fixed to the rotating shaft 121 and be rotated toward the one side of the upper main body 200 by the rotating shaft 121.

In such a structure, when the gate body 122 is rotated toward the one side of the upper main body 200 through the rotating shaft 121 with the transit transfer path unit 110 rotated and folded toward the gate body 122 as illustrated in FIG. 4, the gate body 122 and the transit transfer path unit 110 connected to the gate body 122 may be simultaneously rotated to the one side of the upper main body 200 as illustrated in FIG. 5. Through this process, the gate body 122 and the transit transfer path unit 110 can be completely retreated to the one side of the upper main body 200.

In the present embodiment, the gate unit 120 is configured in such a manner that the gate body 122 can be rotated toward the one side of the upper main body 200 through the rotating shaft 121 of the hinge structure. The present disclosure is not limited thereto, but it is obvious that various structures capable of retreating the gate body toward the one side of the upper main body can be applied.

In another embodiment of the gate unit, a vertical frame may be installed at one edge of the top surface of the lower main body at the rear of the upper main body, and a hinge may be coupled between the vertical frame and the gate body, such that the gate body can be rotated to the one side of the upper main body through the hinge. In addition, the gate unit may be formed with a sliding structure through a guide rail or the like.

In the transit transfer path unit structure for the supply/collection cassette of the ATM in accordance with the present embodiment, the transit transfer path unit provided at the rear of the upper main body of the ATM so as to connect the supply/collection cassette to the banknote transfer path of the upper main body may be rotated upward/downward so as to be folded toward the gate unit. Simultaneously, the transit transfer path unit may be rotated toward the one side of the upper main body through the gate unit so as to be completely retreated from the upper main body. Therefore, when the upper main body is pulled backward from the ATM during maintenance work for the ATM, the upper main body may be pulled out of the ATM after the transit transfer path unit and the gate unit are completely retreated from the upper main body, which makes it possible to effectively prevent interference between the upper main body and the transit transfer path unit. Such a structure can increase the convenience of the maintenance of the ATM.

As illustrated in FIGS. 2 and 3, the fixing member 140 may be provided on one side of the side surface of the transit transfer path unit 110 in order to fix the transit transfer path unit 110 to the supply/collection cassette 400 or the gate unit 120.

That is, the fixing member 140 may be formed in a lever shape and provided on the one side of the side surface of the transit transfer path unit 110, and have a pair of hooks 141*a* and 141*b* formed at both ends of the lever body.

The gate unit 120 has a first locking part 142 provided on one side of the rear surface of the gate unit 120, such that one hook 141*a* of the fixing member 140 provided on the transit transfer path unit 110 is locked and coupled to the first locking part 142, with the transit transfer path unit 110 folded toward the gate unit 120.

Furthermore, a second locking part 143 is also provided on one side of the top surface of a cassette mounting part 320 which is provided to mount the supply/collection cassette 400 at the rear surface of the lower main body 300, such that the other hook 141*b* of the fixing member 140 provided on the transit transfer path unit 110 is locked and coupled to the second locking part 143, with the transit transfer path unit 110 unfolded to connect the supply/collection cassette 400 to the banknote transfer path 240 of the upper main body 200.

In such a configuration, when the transit transfer path unit is folded toward the gate unit or unfolded to connect the supply/collection cassette to the banknote transfer path of the upper main body, the transit transfer path unit may not be moved but reliably fixed. Therefore, when banknotes are transferred through the transit transfer path unit, the transit transfer path unit may be reliably fixed to the supply/collection cassette, which makes it possible to effectively prevent an error such as jam. Furthermore, even during a maintenance process of the ATM, the gate unit and the transit transfer path unit may be fixed to each other and effectively retreated from the upper main body, which makes it possible to further increase the convenience of the maintenance.

As illustrated in FIG. 4, the transit transfer path unit may further include a coupling pin 150 coupled to the supply/collection cassette in connection with the fixing member. Thus, when the transit transfer path unit is connected and fixed between the supply/collection cassette and the banknote transfer path within the ATM, the banknote transfer routes between the supply/collection cassette and the transit transfer path may be accurately aligned with each other and coupled to each other through the coupling pin, which makes it possible to more effectively prevent an error such as jam which may occur during the banknote supply or collection process.

That is, the coupling pin 150 may be connected to a rotating shaft (not illustrated) of the fixing member 140 and protruded or retreated in one direction according to rotation of the fixing member 140, and the supply/collection cassette may have a coupling groove 410 formed at a position corresponding to the coupling pin 150 at the top surface thereof. When the transit transfer path unit is connected and fixed between the supply/collection cassette and the banknote transfer path within the ATM, the coupling pin 150 may be protruded from the bottom surface of the transit transfer path unit in connection with the rotation of the fixing member 140 and inserted into the coupling groove of the supply/collection cassette. Thus, the banknote transfer routes between the supply/collection cassette and the transit transfer path can be more accurately aligned with each other and coupled to each other.

When the transit transfer path unit and the supply/collection cassette are separated from each other, the coupling pin 150 may be retreated into the bottom surface of the transit transfer path unit in connection with the rotation of the fixing member, such that the supply/collection cassette and the transit transfer path unit can be easily separated from each other.

So far, the present disclosure has been described with reference to the preferred embodiments, but is not limited to the above-described embodiment. It is obvious to those skilled in the art that the present disclosure can be replaced and modified in various manners without departing from the technical spirit of the present disclosure, and the modifications belong to the technical range of the present disclosure.

The transit transfer path unit structure for the supply/collection cassette of the ATM in accordance with the present disclosure is disposed at the rear of the upper main body of the ATM, such that the transit transfer path unit for connecting the supply/collection cassette mounted on the rear surface of the lower main body of the ATM to the banknote transfer path of the upper main body is detachably provided between the supply/collection cassette and the banknote transfer path provided in the upper main body. Thus, during maintenance work for the ATM, the transit transfer path unit may be separated from the banknote transfer route that connects the supply/collection cassette to the banknote transfer path provided in the upper main body. Therefore, the upper main body may be easily pulled to the front or rear of the ATM without any interference with the transit transfer path unit, in order to perform the maintenance work, which makes it possible to increase the convenience of the maintenance of the ATM.

Furthermore, the transit transfer path unit structure may include the lever-shaped fixing member formed on one side of the transit transfer path unit and having the pair of hooks formed thereon and the coupling pin coupled to the supply/collection cassette in connection with the fixing member, in order to reliably fix the coupling position of the transit transfer path unit which is detachably coupled through the fixing member. When the transit transfer path unit is coupled and fixed between the supply/collection cassette and the banknote transfer path within the ATM, the banknote transfer routes between the supply/collection cassette and the transit transfer path may be accurately aligned with each other and coupled to each other through the coupling pin.

Therefore, an occurrence of alignment error on the banknote transfer path can be prevented to effectively reduce a banknote transfer error.

What is claimed is:

1. A transit transfer path unit structure for a supply/collection cassette of an Automated Teller Machine (ATM) which includes an upper main body having a deposit/withdrawal part, a temporary storage part and a banknote transfer path and a lower main body having a plurality of banknote cassettes, and has a structure in which a supply/collection cassette is mounted on one side of the lower main body, wherein the transit transfer path unit structure comprises a transit transfer path unit connected to form a banknote transfer route between the supply/collection cassette and the banknote transfer path provided in the upper main body, and detachably mounted between the supply/collection cassette and the banknote transfer path provided in the upper main body, wherein during maintenance work for the ATM, the transit transfer path unit is separated from the banknote transfer route that connects the supply/collection cassette to the banknote transfer path provided in the upper main body, in order to prevent interference during a process of sliding the upper main body to the front or rear of the ATM, wherein the ATM has a gate unit provided between the upper main body and the transit transfer path unit, wherein the transit transfer path unit is hinge-coupled to the bottom of the gate unit so as to be rotated upward/downward on the gate unit, and rotated upward/downward to connect/separate the supply/collection cassette and the banknote transfer path provided in the upper main body to or from each other.

2. The transit transfer path unit structure of claim 1, wherein the gate unit is formed in a door shape so as to be rotated to one side of the upper main body through hinge coupling, wherein during maintenance work for the ATM, the transit transfer path unit disposed on one side of the upper main body and connected to the supply/collection cassette is rotated upward on the gate unit, and simultaneously the gate unit connected to the transit transfer path unit is rotated to the one side of the upper main body, such that the transit transfer path unit is retreated to the outside of the upper main body in order to prevent interference during a process of sliding the upper main body forward/backward.

3. The transit transfer path unit structure of claim 2, wherein the gate unit comprises:

a rotating shaft vertically fixed to one edge of the top surface of the lower main body at the rear of the upper main body; and a gate body having one side fixed to the rotating shaft so as to be rotated to the one side of the upper main body by the rotating shaft.

4. The transit transfer path unit structure of claim 1, wherein the gate unit has a through-hole formed at the bottom of the gate body, such that the transit transfer path unit is connected to the banknote transfer path provided in the upper main body through the gate unit.

5. The transit transfer path unit structure of claim 1, wherein a transit transfer path for transferring banknotes is provided in the transit transfer path unit.

6. The transit transfer path unit structure of claim 1, wherein a hinge coupling structure for connecting the transit transfer path unit and the gate unit comprises:

a hinge shaft horizontally disposed and fixed on the gate unit; and a pair of rotating frames each having one end rotatably fixed to the hinge shaft and the other end fixed to a side surface of the transit transfer path unit.

7. The transit transfer path unit structure of claim 1, wherein the transit transfer path unit has a lever-shaped fixing member provided on one side thereof, the fixing member having a pair of hooks formed at both ends of the body thereof, the gate unit has a first locking part formed on one side of the top surface thereof, such that one hook of the fixing member is locked and coupled to the first locking part, and a second locking part is provided on one side of the top surface of a cassette mounting part which is provided at the rear of the lower main body so as to mount the supply/collection cassette, such that the other hook of the fixing member is locked and coupled to the second locking part.

8. The transit transfer path unit structure of claim 7, wherein the transit transfer path unit has a coupling pin coupled to the supply/collection cassette in connection with the fixing member, wherein the supply/collection cassette has a coupling groove formed at a position corresponding to the coupling pin at the top surface thereof, wherein when the transit transfer path unit is connected and fixed between the banknote transfer path and the supply/collection cassette within the ATM, the coupling pin is inserted and coupled to the coupling groove.

9. The transit transfer path unit structure of claim 8, wherein the coupling pin is protruded from the bottom surface of the transit transfer path unit in connection with the fixing member or retreated into the bottom surface of the transit transfer path unit.

* * * * *